No. 799,568. PATENTED SEPT. 12, 1905.
C. C. HOVEY.
SEALING JAR FOR PRESERVING VARIOUS ARTICLES, SUCH AS FOOD, &c.
APPLICATION FILED OCT. 17, 1904.

Witnesses
Chas. H. Smith
Leopold Leer

Inventor
Charles C. Hovey
per Harold Serrell
Atty

UNITED STATES PATENT OFFICE.

CHARLES CORNWELL HOVEY, OF BAINBRIDGE, NEW YORK.

SEALING-JAR FOR PRESERVING VARIOUS ARTICLES, SUCH AS FOOD, &c.

No. 799,568.           Specification of Letters Patent.           Patented Sept. 12, 1905.

Application filed October 17, 1904. Serial No. 228,677.

*To all whom it may concern:*

Be it known that I, CHARLES CORNWELL HOVEY, a citizen of the United States, residing at Bainbridge, in the county of Chenango and State of New York, have invented an Improvement in Sealing-Jars for Preserving Various Articles, Such as Food, &c., of which the following is a specification.

My invention relates to the class of sealing-jars for preserving various articles in which the jar is made of glass or other vitreous or suitable material and the cover of sheet metal with a closure between the two parts and by which the sealing is effected by atmospheric pressure.

The object of my invention is to provide a sealing-jar wherein the gasket, of rubber or similar material, may have the opportunity to move or shift its position as the cover is brought down firmly to place, so as to insure the said gasket conforming to all the inequalities of the body of the jar as well as of the cover, so as to insure the sealing of the package. I construct the sealing-jar of my present invention with suitable walls, a flat or level upper edge, and with a tapering portion of appreciable length at the upper edge on the inner side merging or joining with the flat or level upper edge and the lower edge of the tapering portion merging or joining with the inner surface of the jar or the inner surface of parallel walls. The cover is of dishing form, and the edge of said dishing cover conforms closely to the tapering portion of the top and to the inner surface of the body or parallel walls.

The gasket is preferably a flat rubber band placed upon the lower parallel parts or walls of the cover which in position snugly fits the inner surface or walls of the jar-body, and when the cover is forced down to place said gasket shifts to conform to and fit all the inequalities of the jar-body or juxtaposed walls and cover and may move up into the intersection of the parallel parts with the tapering portions, and thus complete the sealing.

Figure 1:
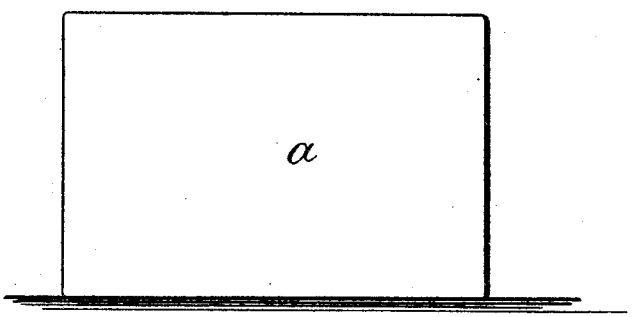
Figure 2:
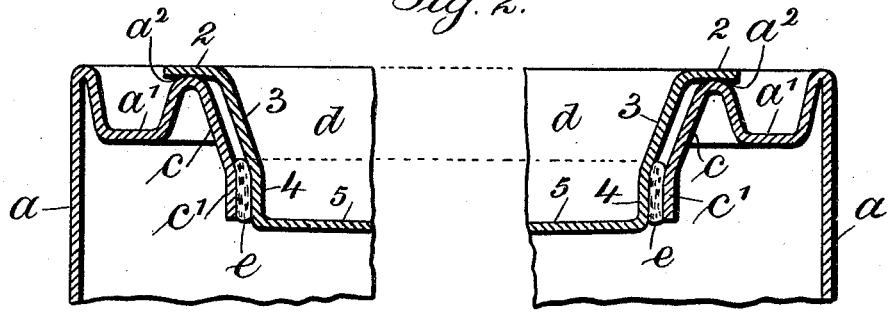
Figure 3:
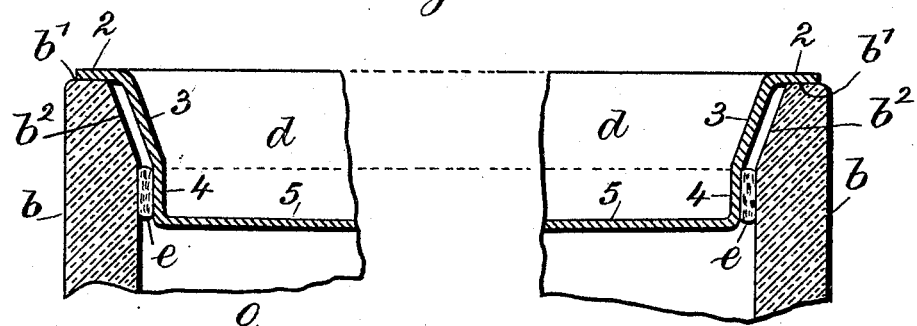
Figure 4:
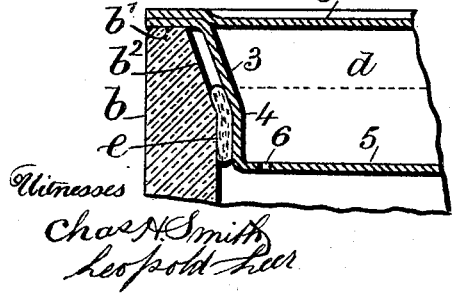

In the drawings, Figure 1 is an elevation of a jar or receptacle for preserving articles of food. Fig. 2 is a vertical broken section at the upper end of said jar and of larger size. Fig. 3 is a broken vertical section at the upper end of a jar and cover, representing the preferred form of my invention, in which the body of the jar is of glass or other similar vitrified or suitable material. Fig. 4 is a broken vertical section at one side similar to Fig. 3, but representing that the cover may be double, as shown and described in an application for Letters Patent filed by me October 17, 1904, Serial No. 228,676, and duly allowed December 17, 1904.

Referring to Figs. 1 and 2, $a$ represents the body of the metal jar or can, the metal of which is preferably carried inward at the upper edge to form the turned-over and recessed portion $a'$. $c$ represents a tapering portion at the upper edge and inner side of the metal body and which from the flat or level upper edge $a^2$ extends downward with a gradual contraction into the jar at an inclination of about seventy degrees to the horizontal, $c'$ representing the vertical inner wall of the metal jar $a$ parallel to the outer wall of the jar.

The cover $d$ of dishing form—that is, a recessed sheet-metal structure—is provided with a flat rim 2, with inclined walls 3 of approximately seventy degrees to the horizontal and which should be substantially parallel with the tapering portion $c$ of the body, with vertical walls 4, which should be substantially parallel with the vertical walls $c'$ of the body, and with an imperforate bottom plate 5. The gasket $e$ or flat rubber band in its normal emplacement with reference to the cover $d$ extends around the vertical walls 4 and is of such thickness beyond the diameter of the walls 4 as to snugly fit between the vertical walls $c'$ of the body.

The cover is adapted in this art to be forced down to place after the air has been exhausted from the jar or can in such machines as are provided in this art for this purpose, the cover being forced to place after the air is exhausted and held in such position until after the air has been admitted to the machine to establish the external holding and atmospheric pressure. As the cover is brought down to place, the gasket $e$ is free to move up the vertical walls 4 and to thin under pressure or expand into the space between the juxtaposed surfaces of the walls 4 and $c'$, so as to fit and fill all the inequalities of said surfaces and to even creep up into the intersection of such parallel parts with the tapering portions and, as it were, pass around the corner of such intersection in an effort to make a perfect and complete closure or seal to the jar.

Referring to Fig. 3, the cover in all its parts is identical with the cover hereinbefore described with reference to Figs. 1 and 2. The gasket is the same, and the functions performed in the seating of the cover upon the body and the operations of the gasket are identical with those hereinbefore described. The body $b$ of the jar, however, is represented as formed of glass or other vitrified or similar material in contradistinction to sheet metal, and it is provided with a flat top $b'$, with a tapering portion $b^2$, agreeing for the function performed with the tapering portion $c$ of the structure shown in Fig. 2, and in this jar the inner surface of the jar serves for the performance of a like function with the vertical walls $c'$ of the structure, Fig. 2. In both of these structures to unseal the package it is necessary to perforate the bottom plate 5 with a suitable instrument, so as to provide for the entrance of air to establish a like pressure on both sides of the cover, when the same may be readily removed.

In Fig. 4 I have shown a part of the body of a jar corresponding to that shown in Fig. 3 and a cover the lower shell of which corresponds with the cover shown in Figs. 2 and 3. The cover herein, however, is provided with a top shell $o$ and with holes at 6. This cover, however, forms the subject of the hereinbefore-mentioned application and is herein illustrated in its connection with the peculiarity of the body of the can and the dishing cover.

From the foregoing it is obvious that the jar of my improvement is adapted to receive and hold and to preserve when sealed any articles that it is desired to keep from contact with the atmosphere, regardless of whether they are articles of food or articles of merchandise, because while the form of jar shown in Figs. 3 and 4 may be especially applicable for preserving articles of food the jar shown in Figs. 1 and 2 is not only applicable for preserving articles of food, but may be employed to hold paint, oils, and other articles of merchandise.

I claim as my invention—

1. A sealing-jar for preserving articles, comprising a body and cover of suitable material, the cover fitting within and resting upon the body and said parts provided with similar concentric tapering and vertical portions, and a gasket between said portions for effecting the seal.

2. A sealing-jar for preserving articles by atmospheric pressure, comprising a body and cover of suitable material, the cover fitting down into the open top of the body and resting thereon and both said parts having portions or inclined walls that are approximately seventy degrees to the horizontal and adjacent vertical walls merging with the inclined walls, and a gasket between the said parts for effecting the seal.

3. In a sealing-jar for preserving articles, the combination with a body of suitable material having a level upper edge and a tapering portion of appreciable length at the upper edge on the inner side and vertical walls from the lower edge of the tapering portion, of a cover of dishing form adapted to fit down into the said jar and to rest thereon when closed and having parts conforming to and occupying a juxtaposed relation with the parts of said body, and a gasket received between said parts and circumferentially adapted to fill a part of the space and the inequalities in the juxtaposed surfaces in effecting a perfect seal.

4. In a sealing-jar for preserving articles, the combination with a body of suitable material having a level upper edge and a tapering portion of appreciable length at the upper edge on the inner side and vertical walls from the lower edge of the tapering portion, of a cover of dishing form adapted to fit down into the body and to rest upon the upper edge when sealed, said cover having a flat rim, inclined walls at approximately seventy degrees to the horizontal and adjacent vertical walls, and an imperforate bottom plate, said inclined walls and vertical walls forming continuations of one another and being substantially parallel to the tapering and vertical portions of the body, and a gasket adapted to be received between said parts and to circumferentially fill a portion of the space between the said parts and fill and conform to the inequalities of the juxtaposed surfaces in effecting a perfect seal.

5. In a sealing-jar for preserving articles, the combination with a body of suitable material having a level upper edge and a tapering portion of appreciable length at the upper edge on the inner side, and vertical walls from the lower edge of the tapering portion, of a cover of dishing form adapted to fit down into the body and to rest upon the upper edge when sealed, said cover having a flat rim, inclined walls at approximately seventy degrees to the horizontal, and adjacent vertical walls, and an imperforate bottom plate, said inclined walls and vertical walls forming continuations of one another and being substantially parallel to the tapering and vertical portions of the body, a gasket of rubber in the form of a flat band normally surrounding the vertical walls of the cover and of a thickness to fully circumferentially fill a part of the space between the juxtaposed surfaces of the cover and body of the jar and extend into the inequalities of the juxtaposed surfaces and to be able to shift in its position as the cover is forced down to place so as to effect a perfect seal.

6. A sealing-jar for preserving articles, comprising a body and cover of suitable material, the cover fitting within and having a flange resting upon the body and said parts provided with similar concentric tapering and vertical portions, and a gasket of rubber in the form of a flat band between said portions for effecting the seal.

7. A sealing-jar for preserving articles by atmospheric pressure, comprising a body and cover of suitable material, the cover fitting down into the open top of the body, and both said parts having portions or inclined walls that are approximately seventy degrees to the horizontal and adjacent vertical walls merging with the inclined walls, and a flat parallel-sided gasket normally positioned between said vertical walls for effecting the seal.

8. In a sealing-jar for preserving articles, the combination with a body of suitable material having a substantially level upper edge and a tapering portion of appreciable length at the upper edge on the inner side, and vertical walls from the lower edge of the tapering portion and a cover of dishing form adapted to fit down into said jar and having parts conforming to and occupying a juxtaposed relation with the parts of said body, and a gasket received between said parts and circumferentially adapted to fill a part of the space and the inequalities in the juxtaposed surfaces in effecting a perfect seal.

9. A sealing-jar for preserving articles by atmospheric pressure, comprising a body of suitable material and a cover of sheet metal, the cover fitting down into the open top of the body, and both of said parts having portions or inclined walls that are approximately seventy degrees to the horizontal and adjacent vertical walls merging with the inclined walls, and a flat parallel-sided gasket normally positioned between said vertical walls for effecting the seal.

Signed by me this 7th day of October, 1904.

CHARLES CORNWELL HOVEY.

Witnesses:
JULIEN SCOTT,
VERNON HOVEY.